(12) United States Patent
Jin et al.

(10) Patent No.: US 10,819,163 B2
(45) Date of Patent: Oct. 27, 2020

(54) APPARATUS AND METHOD FOR TRANSMITTING POWER WIRELESSLY

(71) Applicant: HITACHI-LG DATA STORAGE KOREA, INC., Seoul (KR)

(72) Inventors: Cheol Jin, Seoul (KR); Hogil Lee, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 0 days.

(21) Appl. No.: 16/358,470

(22) Filed: Mar. 19, 2019

(65) Prior Publication Data

US 2020/0076245 A1    Mar. 5, 2020

(30) Foreign Application Priority Data

Sep. 4, 2018    (KR) .................... 10-2018-0105432

(51) Int. Cl.
*H02J 50/60*    (2016.01)
*H02J 50/12*    (2016.01)
*H02J 50/80*    (2016.01)

(52) U.S. Cl.
CPC .............. *H02J 50/60* (2016.02); *H02J 50/12* (2016.02); *H02J 50/80* (2016.02)

(58) Field of Classification Search
CPC ......................... H04B 5/0037; B60L 53/124
See application file for complete search history.

(56) References Cited

U.S. PATENT DOCUMENTS

| | | | |
|---|---|---|---|
| 9,939,539 B2 * | 4/2018 | Oettinger | H02J 50/60 |
| 10,003,221 B2 * | 6/2018 | Murakami | H02J 50/60 |
| 10,581,281 B2 * | 3/2020 | Muratov | H02J 50/12 |
| 10,630,113 B2 * | 4/2020 | Tsai | G05F 1/66 |
| 2018/0262049 A1 * | 9/2018 | Ikefuji | H02J 7/025 |
| 2019/0265317 A1 * | 8/2019 | Ortiz | G01R 33/3657 |
| 2019/0312467 A1 * | 10/2019 | Mynar | H02J 50/60 |
| 2019/0319494 A1 * | 10/2019 | Park | H02J 7/02 |
| 2019/0326786 A1 * | 10/2019 | Kim | H02J 50/12 |

* cited by examiner

*Primary Examiner* — Thomas J. Hiltunen
(74) *Attorney, Agent, or Firm* — Birch, Stewart, Kolasch & Birch, LLP

(57) ABSTRACT

The present invention provides wireless power transmitting method and apparatus. The wireless power transmitting method according to an embodiment of the present invention may measure a resonance frequency while changing an operating frequency of a resonance circuit, compare the measured resonance frequency with a reference frequency, and wirelessly transmit power when the measured resonance frequency is lower than the reference frequency. The reference frequency may be determined based on two or more among a self resonance frequency of the resonance circuit, a first resonance frequency measured for a receiving device, a second resonance frequency measured for a reference object and a third resonance frequency measured for the receiving device and the reference object.

10 Claims, 7 Drawing Sheets

APPARATUS AND METHOD FOR TRANSMITTING POWER WIRELESSLY

This application claims the benefit of priority under 35 U.S.C. § 119(a) to Korean Patent Application No. 10-2018-0105432 filed on Sep. 4, 2018, which is incorporated by reference herein in its entirety.

BACKGROUND

Field

The present invention relates to an apparatus and a method for transmitting power wirelessly, and more particularly, to a method for effectively detecting a metallic foreign object between a transmitting apparatus and a receiving device.

Related Art

With the development of communication and information processing technology, use of smart terminals such as a smart phone, and the like has gradually increased and at present, a charging scheme generally applied to the smart terminals is a scheme that directly connects an adapter connected to a power supply to the smart terminal to charge the smart phone by receiving external power or connects the adapter to the smart terminal through a USB terminal of a host to charge the smart terminal by receiving USB power.

In recent years, in order to reduce inconvenience that the smart terminal needs to be directly connected to the adapter or the host through a connection line, a wireless charging scheme that wirelessly charges a battery by using magnetic coupling without an electrical contact has been gradually applied to the smart terminal.

There are several methods for supplying or receiving electric energy wirelessly, which representatively include an inductive coupling scheme based on an electromagnetic induction phenomenon and an electromagnetic resonance coupling scheme based on an electromagnetic resonance phenomenon by a wireless power signal of a specific frequency.

In both schemes, a wireless charging apparatus and an electronic device such as the smart terminal form a communication channel therebetween to send and receive data, thereby securing stability of power transmission and increasing transmission efficiency. In the inductive coupling scheme, there is a problem which a power receiving device moves during wirelessly transmitting the power so the transmission efficiency is deteriorated. And, in the resonance coupling scheme, noise may be generated in the communication channel, and as a result, a phenomenon may occur, in which the power transmission is stopped.

When a foreign metal such as a coin is between a power transmitting apparatus and a power receiving device, power loss occurs, and there is a risk of heat generation if wirelessly transmitted power is concentrated on the metallic foreign object, which interferes with stable power transmission. So, a foreign object detection (FOD) function capable of detecting whether or not a metallic object is placed on a power transmitting apparatus is essentially implemented in a recent product to which the wireless charging standard using the inductive coupling scheme is applied.

To detect metallic foreign objects, a technique for detecting a difference between a transmission power and a reception power and determining whether or not the power difference is equal to or greater than a predetermined value or a technique of comparing the Q-factor at the resonant frequency of a transmitting coil with the Q-factor stored at the receiving device is generally used. However, in the latter case, there is a problem that it cannot be applied to the receiving device in which the Q-factor is not stored.

SUMMARY

The present invention has been made in view of such circumstances, and it is an object of the present invention to effectively detect whether a metallic foreign object is located between a transmitting apparatus and a receiving device or on the transmitting apparatus.

A method of transmitting power in a wireless power transmitting apparatus according to an embodiment of the present invention may comprise: measuring a resonance frequency while changing an operating frequency of a resonance circuit; comparing the measured resonance frequency with a reference frequency; and wirelessly transmitting power when the measured resonance frequency is lower than the reference frequency.

In an embodiment, the reference frequency may be determined based on two or more among a self resonance frequency of the resonance circuit, a first resonance frequency measured for a receiving device, a second resonance frequency measured for a reference object and a third resonance frequency measured for the receiving device and the reference object.

In an embodiment, the method may notify a presence of a foreign object without transmitting power when the measured resonance frequency is lower than the reference frequency.

In an embodiment, a reference voltage, which is applied to a coil included in the resonance circuit when driving the resonance circuit in a state where no object is present on the wireless power transmitting apparatus, the reference frequency and the self resonance frequency may be stored in a process of shipping the wireless power transmitting apparatus.

In an embodiment, the method may compare a first voltage applied to the coil while driving the resonance circuit with the measured resonance frequency with the reference voltage, when a difference between the measured resonance frequency and the self resonance frequency is less than a first predetermined value, and notify a presence of a foreign object without transmitting power, when a difference between the reference voltage and the first voltage is larger than a second predetermined value.

In an embodiment, the method may judge that nothing is placed on the wireless power transmitting apparatus when the difference between the reference voltage and the first voltage is less than the second predetermined value.

A wireless power transmitting apparatus according to another embodiment of the present invention may comprise: a power conversion unit including an inverter for converting a DC input into an AC waveform, a resonance circuit including a primary coil for transmitting power by magnetic induction coupling with a secondary coil of a receiving device, and a sensing unit for measuring an output voltage applied to the primary coil, and a control unit configured to measure a resonance frequency based on the output voltage measured by the sensing unit while changing an operating frequency of the resonance circuit, compare the measured resonance frequency with a reference frequency, and control the inverter to wirelessly transmitting power to the receiving device when the measured resonance frequency is lower than the reference frequency.

Accordingly, even with respect to a low-cost receiving device that does not store Q-factor, the power transmitting apparatus can effectively determine whether metallic foreign objects are present on the transmitting apparatus or between the transmitting apparatus and the receiving device, from small foreign objects to large foreign objects.

In addition, a safety problem in which power is concentrated on metallic foreign objects during wireless power transmission and heat generation becomes severe can be avoided.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, an embodiment of a wireless power transmitting apparatus and a method according to the present invention will be described in detail with reference to the accompanying drawings.

Figure 1:
FIG. 1 conceptually illustrates that power is wirelessly transmitted from a power transmitting apparatus to an electronic device.

FIG. 1 conceptually illustrates that power is wirelessly transmitted from a wireless power transmitting apparatus to an electronic device.

The wireless power transmitting apparatus 100 may be a power transferring apparatus wirelessly transferring power required by a wireless power receiving apparatus or an electronic device 200, or a wireless charging apparatus for charging a battery by wirelessly transferring power. Or the wireless power transmitting apparatus 100 may be implemented by one of various types of apparatuses transferring power to the electronic device 200 requiring power with non-contact.

The electronic device 200 may be operable by wirelessly receiving power from the wireless power transmitting apparatus 100 and charge a battery by using wirelessly received power. The electronic device that wirelessly receives power may include portable electronic devices, for example, a smart phone, a tablet computer, a multimedia terminal, an input/output device such as a keyboard, a mouse, a video or audio auxiliary device, a secondary battery, and the like.

Power may be wirelessly transmitted by an inductive coupling scheme based on an electromagnetic induction phenomenon by a wireless power signal generated by the wireless power transmitting apparatus 100. That is, resonance is generated in the electronic device 200 by the wireless power signal transmitted by the wireless power transmitting apparatus 100 and power is transferred from the wireless power transmitting apparatus 100 to the electronic device 200 without contact by the resonance. A magnetic field is changed by an AC current in a primary coil and current is induced to a secondary coil by the electromagnetic induction phenomenon to transfer power.

When the intensity of the current that flows on a primary coil of the wireless power transmitting apparatus 100 is changed, the magnetic field passing through the primary coil (or a transmitting Tx coil) is changed by the current and the changed magnetic field generates induced electromotive force at a secondary coil (or a receiving Rx coil) in the electronic device 200.

When the wireless power transmitting apparatus 100 and the electronic device 200 are disposed such that the transmitting coil at the wireless power transmitting apparatus 100 and the receiving coil at the electronic device 200 come close to each other and the wireless power transmitting apparatus 100 controls the current of the transmitting coil to be changed, the electronic device 200 may supply power to a load such as a battery by using the electromotive force induced to the receiving coil.

Efficiency of the wireless power transmission based on the inductive coupling scheme is influenced by a layout and a distance between the wireless power transmitting apparatus 100 and the electronic device 200. The wireless power transmitting apparatus 100 is configured to include a flat interface surface and a transmitting coil is mounted on the bottom of the interface surface and one or more electronic devices may be laid on the top of the interface surface. By making the gap between the transmitting coil mounted on the bottom of the interface surface and the receiving coil positioned on the top of the interface surface sufficiently small, the efficiency of the wireless power transmission by the inductive coupling method can be increased.

A mark indicating a location where the electronic device is to be laid may be displayed on the top of the interface surface. The mark may indicate indicate the position of the electronic device which makes the arrangement between the primary coil mounted on the bottom of the interface surface and the secondary coil suitable. A protruded structure for guiding the location of the electronic device may be formed on the top of the interface surface. And a magnetic body may be formed on the bottom of the interface surface so that the primary coil and the secondary coil can be guided by an attractive force with a magnetic body of the other pole provided inside the electronic device.

Figure 2:
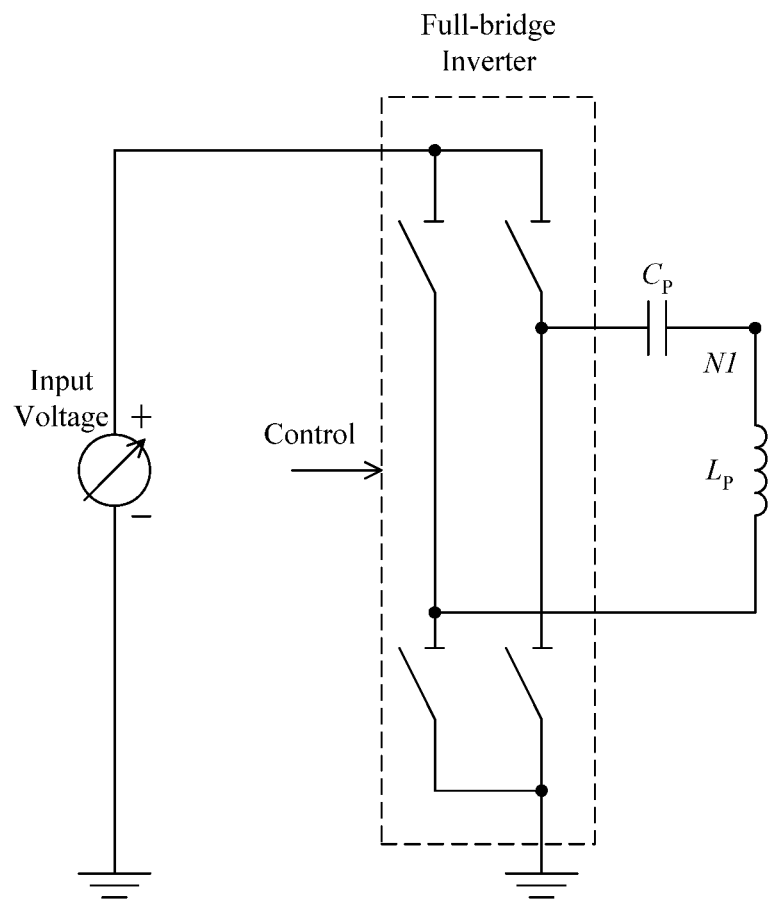
FIG. 2 conceptually illustrates a circuit configuration of a power conversion unit of a transmitting apparatus for wirelessly transmitting power in an electromagnetic induction scheme.

FIG. 2 conceptually illustrates a circuit configuration of a power conversion unit of a transmitting apparatus for wirelessly transmitting power in an electromagnetic induction scheme.

The wireless power transmitting apparatus may include a power conversion unit generally including a power source, an inverter, and a resonance circuit. The power source may be a voltage source or a current source and the power conversion unit converts the power supplied from the power source into a wireless power signal and transfers the converted wireless power signal to a receiving device. The wireless power signal is formed in the form of the magnetic field or an electronic magnetic field having a resonance characteristic. And, the resonance circuit includes a coil generating the wireless power signal.

The inverter converts a DC input into an AC waveform having a desired voltage and a desired frequency through switching elements and a control circuit. And, in FIG. 2 a full-bridge inverter is illustrated and other types of inverters including a half-bridge inverter, and the like are also available.

The resonance circuit includes a primary coil Lp and a capacitor Cp to transmit power based on a magnetic induction scheme. The coil and the capacitor determine a basic resonance frequency of power transmission. The primary coil forms the magnetic field corresponding to the wireless power signal with a change of current and may be implemented in a flat form or a solenoid form.

The AC current converted by the inverter drives the resonance circuit, and as a result, the magnetic field is formed in the primary coil. By controlling the on/off timings of included switches, the inverter generates AC having a frequency close to the resonance frequency of the resonance circuit to increase transmission efficiency of the transmitting apparatus. The transmission efficiency of the transmitting apparatus may be changed by controlling the inverter.

Figure 3:
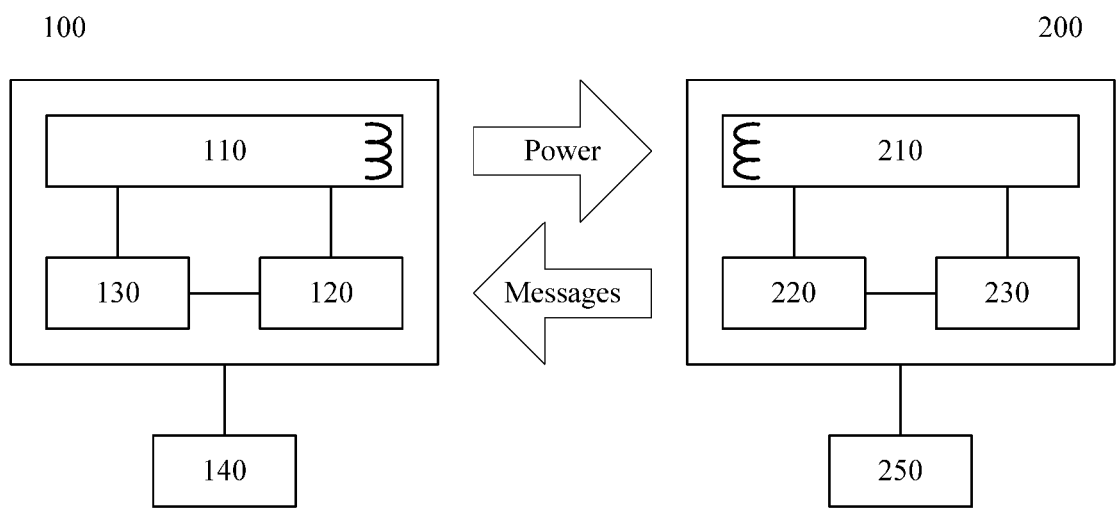
FIG. 3 illustrates a configuration for a wireless power transmitting apparatus and a wireless power receiving device to send and receive power and messages.

FIG. 3 illustrates a configuration for a wireless power transmitting apparatus and a wireless power receiving device to send and receive power and messages.

Since the power conversion unit just transmits power unilaterally regardless of a receiving state of the receiving device, a configuration for receiving feedback associated with the receiving state from the receiving device is required in the wireless power transmission apparatus in order to transmit power in accordance with the state of the receiving device.

The wireless power transmitting apparatus 100 may include a power conversion unit 110, a first communication unit 120, a first control unit 130, and a power supply unit 140. And, the wireless power receiving device 200 may include a power receiving unit 210, a second communication unit 220, and a second control unit 230 and may further include a load 250 to which received power is to be supplied.

The power conversion unit 110 includes the inverter and the resonance circuit of FIG. 2 and may further include a circuit to control characteristics including a frequency, voltage, current, and the like used to form the wireless power signal.

The first communication unit 120, connected to the power conversion unit 110, may demodulate the wireless power signal modulated by the receiving device 200 wirelessly receiving power from the transmitting apparatus 100 in the magnetic induction scheme, thereby detecting a power control message.

The first control unit 130 determines one or more characteristics among an operating frequency, voltage, and current of the power conversion unit 110 based on the message detected by the communication unit 120 and controls the power conversion unit 110 to generate the wireless power signal suitable for the message. The first communication unit 120 and the first control unit 130 may be configured as one module.

The power receiving unit 210 may include a matching circuit, including the secondary coil and a capacitor, which generates the inductive electromotive force according to the change of the magnetic field generated from the primary coil of the power conversion unit 110, and may further include a rectification circuit that rectifies the AC current that flows on the secondary coil to output DC current.

The second communication unit 220, connected to the power receiving unit 210, may change the wireless power signal between the transmitting apparatus and the receiving device by adjusting the load of the power receiving unit in accordance with a method of adjusting a resistive load at DC and/or a capacitive load at AC to transmit the power control message to the transmitting apparatus.

The second control unit 230 controls individual components included in the receiving device. The second control unit 230 may measure an output of the power receiving unit 210 in a current or voltage form and control the second communication unit 220 based on the measured output to transfer the power control message to the wireless power transmitting apparatus 100. The message may direct the wireless power transmitting apparatus 100 to start or terminate the transmission of the wireless power signal and to control characteristics of the wireless power signal.

The wireless power signal formed by the power conversion unit 110 is received by the power receiving unit 210, and the second control unit 230 of the receiving device controls the second communication unit 220 to modulate the wireless power signal. The second control unit 230 may perform a modulation process to change the amount of power received from the wireless power signal by changing the reactance of the second communication unit 220. When the amount of power received from the wireless power signal is changed, a current and/or voltage of the power conversion unit 110 forming the wireless power signal is also changed and the first communication unit 120 of the wireless power transmitting apparatus 100 may sense the change in the current and/or voltage of the power conversion unit 110 and perform a demodulation process.

The second control unit 230 generates a packet including a message to be transferred to the wireless power transmitting apparatus 100 and modulates the wireless power signal to include the generated packet. The first control unit 130 may acquire the power control message by decoding the packet extracted through the first communication unit 120. The second control unit 230 may transmit a message for requesting a change of the characteristic of the wireless power signal based on the amount of power received through the power receiving unit 210 in order to control to-be-received power.

Figure 4:
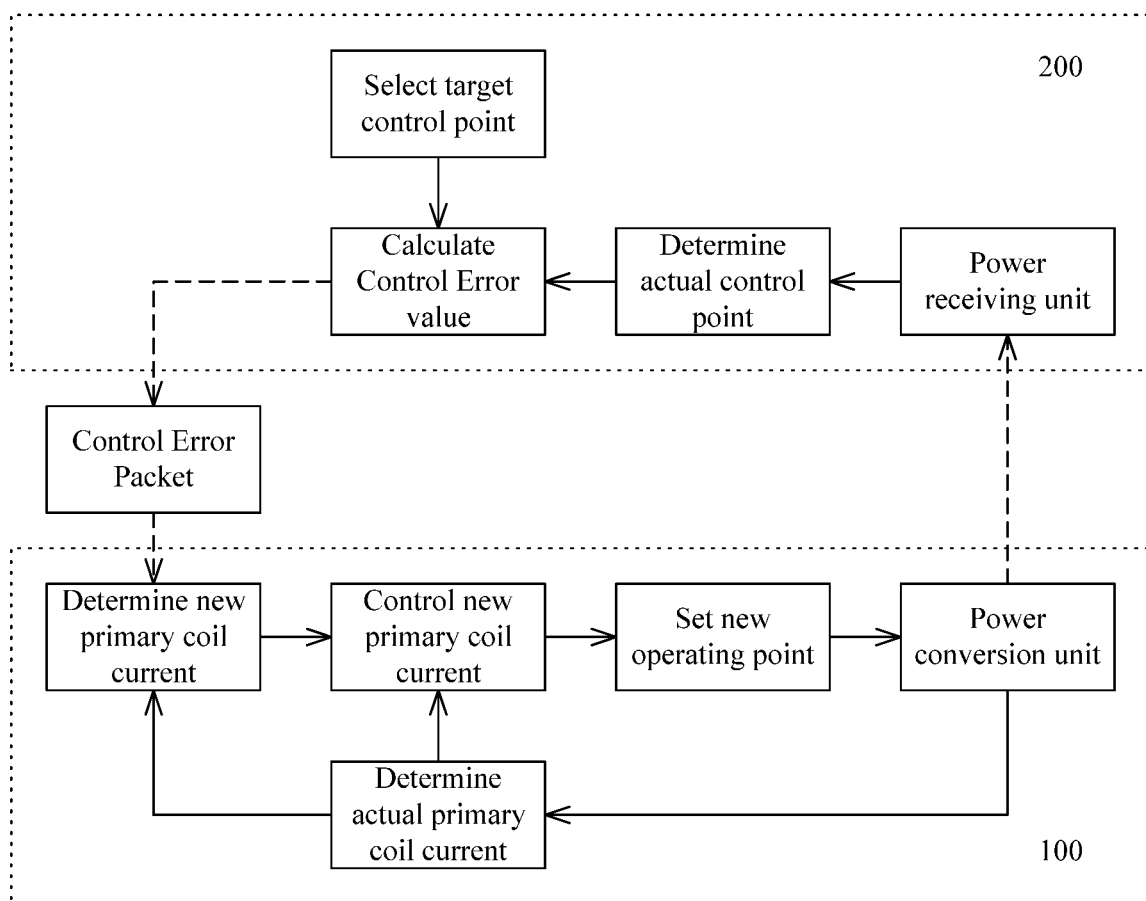
FIG. 4 is a block diagram of a loop for controlling power transmission between a wireless power transmitting apparatus and a wireless power receiving device.

FIG. 4 is a block diagram of a loop for controlling power transmission between a wireless power transmitting apparatus and a wireless power receiving device.

Current is induced in the power receiving unit 210 of the receiving device 200 according to the change of the magnetic field generated by the power conversion unit 110 of the transmitting apparatus 100 and power is transmitted. The second control unit 230 of the receiving device selects a desired control point, that is, a desired output current and/or voltage and determines an actual control point of the power received through the power receiving unit 210.

The second control unit 230 calculates a control error value by using the desired control point and the actual control point while the power is transmitted and may take the difference between, for example, two output voltages or two output currents as the control error value. When less power is required to reach the desired control point, the control error value may be determined to be, for example, a minus value, and when more power is required to reach the desired control point, the control error value may be determined to be a plus value. The second control unit 230 may generate a packet including the calculated control error value calculated by changing the reactance of the power receiving unit 210 with time through the second communication unit 220 to transmit the packet to the transmitting apparatus 100.

The first communication unit 120 of the transmitting apparatus detects a message by demodulating the packet included in the wireless power signal modulated by the receiving device 200 and may demodulate a control error packet including the control error value.

The first control unit 130 of the transmitting apparatus may acquire the control error value by decoding the control error packet extracted through the first communication unit 120 and determine a new current value for transmitting power desired by the receiving device by using an actual current value which actually flows on the power conversion unit 110 and the control error value.

When the process of receiving the control error packet from the receiving device is stabilized, the first control unit 130 controls the power conversion unit 110 so that an operating point reaches a new operating point so an actual current value which flows on the primary coil becomes a new current value and a magnitude, a frequency, a duty ratio, or the like of an AC voltage applied to the primary coil becomes a new value. And, the first control unit 130 controls the new operating point to be continuously maintained so as for the receiving device to additionally communicate control information or state information.

Interactions between the wireless power transmitting apparatus 100 and the wireless power receiving device 200 may comprise four steps of selection, ping, identification and configuration, and power transfer. The selection step is a step for a transmitting apparatus to discover an object laid on the surface of an interface. The ping step is a step for verifying whether the object includes a receiving device. The identification and configuration step is a preparation step for sending power to the receiving device during which appropriate information is received from the receiving device and a power transfer contract with the receiving device is made based on the received information. The power transfer step is a step of actually transmitting power to the receiving device wirelessly through the interaction between the transmitting apparatus and the receiving device.

In the ping step, the receiving device 200 transmits a signal strength packet SSP indicating a magnetic flux coupling degree between a primary coil and a secondary coil through the modulation of a resonance waveform. The signal strength packet SSP is a message generated by the receiving device based on a rectified voltage. The transmitting apparatus 100 may receive the message from the receiving device 200 and use the message to select an initial driving frequency for power transmission.

In the identification and configuration step, the receiving device 200 transmits to the transmitting apparatus 100 an identification packet including a version, a manufacturer code, apparatus identification information, and the like of the receiving device 200, a configuration packet including information including maximum power, a power transmitting method, and the like of the receiving device 200, and the like.

In the power transmitting step, the receiving device 200 transmits to the transmitting apparatus 100 a control error packet CEP indicating a difference between an operating point where the receiving device 200 receives a power signal and the operating point determined in the power transfer contract, a received power packet RPP indicating an average of the power which the receiving device 200 receives through the surface of the interface, and the like.

The received power packet RPP is the data about the amount of received power, which is obtained by taking a rectified voltage, a load current, an offset power, etc. of the power receiving unit 210 of the receiving device, and continuously transmitted to the transmitting apparatus 100 while the receiving device 200 receives power. The transmitting apparatus 100 receives the reception power packet RPP and uses it as an operation factor for power control.

The first communication unit 120 of the transmitting apparatus extracts the packets from change in resonance waveform, and the first control unit 130 decodes the extracted packets to acquire the messages and controls the power conversion unit 110 based thereon to wirelessly transmit power while changing power transmission characteristics as the receiving device 200 requests.

Meanwhile, in a scheme that wirelessly transfers power based on inductive coupling, the efficiency is less influenced by frequency characteristics, but influenced by the arrangement and distance between the transmitting apparatus 100 and the receiving device 200.

An area which the wireless power signal can reach may be divided into two. A portion of the interface surface through which a high efficiency magnetic field can pass when the transmitting apparatus 100 wirelessly transmits power to the receiving device 200 may be referred to as an active area. An area where the transmitting apparatus 100 can sense the existence of the receiving device 200 may be referred to as a sensing area.

The first control unit 130 of the transmitting apparatus may sense whether the receiving device is disposed in or removed from the active area or the sensing area. The first control unit 130 may detect whether the receiving device 200 is disposed in the active area or the sensing area by using the wireless power signal formed in the power conversion unit 110 or using a separately provided sensor.

For example, the first control unit 130 may detects whether the receiving device exists by monitoring whether the power characteristics for forming the wireless power signal is changed while the wireless power signal is being affected by the receiving device 200 existing in the sensing area. The first control unit 130 may perform a process of identifying the receiving device 200 or determine whether to start wireless power transfer, according to a result of detecting the existence of the receiving device 200.

The power conversion unit 110 of the transmitting apparatus may further include a position determination unit. The position determination unit may move or rotate the primary coil in order to increase the efficiency of the wireless power transfer based on the inductive coupling scheme and in particular, be used when the receiving device 200 does not exist in the active area of the transmitting apparatus 100.

The position determination unit may include a driving unit for moving the primary coil so that a distance between the centers of the primary coil of the transmitting apparatus 100 and the secondary coil of the receiving device 200 is within a predetermined range or so that the centers of the primary coil and the secondary coil overlap with each other. To this end, the transmitting apparatus 100 may further include a sensor or a sensing unit for sensing the position of the receiving device 200. And the first control unit 130 of the transmitting apparatus may control the position determination unit based on the positional information of the receiving device 200, which is received from the sensor of the sensing unit.

Alternatively, the first control unit 130 of the transmitting apparatus may receive control information regarding the arrangement with or distance from the receiving device 200 through the first communication unit 120 and control the position determination unit based on the control information.

Further, the transmitting apparatus 100 may include two or more primary coils to increase transmission efficiency by selectively using some primary coils arranged appropriately with the secondary coil of the receiving device 200 among the two or more primary coils. In this case, the position determination unit may determine which primary coils of the two or more primary coils are used for power transmission.

A single primary coil or a combination of one or more primary coils forming the magnetic field passing through the active area may be designated as a primary cell. The first control unit 130 of the transmitting apparatus may sense the position of the receiving device 200, determine the active area based on the determined active area, connect a transmitting module configuring the primary cell corresponding to the active area and control the primary coils of the transmitting module to be inductively coupled to the secondary coil of the receiving device 200.

Meanwhile, since the receiving device 200 is embedded in a smart phone or an electronic apparatus such as a multimedia reproduction terminal or a smart apparatus and is laid in a direction or a location which is not constant in a vertical or horizontal direction on the surface of the interface of the transmitting apparatus 100, the transmitting apparatus requires a wide active area.

When a plurality of primary coils are used in order to widen the active area, driving circuits are required as many as the primary coils and controlling the plurality of primary coils is complicated. As a result, the cost of the transmitting apparatus or a wireless charger increases during commercialization. Further, in order to extend the active area, even when a scheme of changing the location of the primary coil is applied, since it is necessary to provide a transport mechanism for moving the location of the primary coil, there is a problem that a volume and a weight increase and manufacturing cost increases.

A method that extends the active area even with one primary coil of which the location is fixed is effective. However, when the size of the primary coil is just increased, a magnetic flux density per area decreases and magnetic coupling force between the primary coil and the secondary coil is weakened. As a result, the active area is not so increased as expected and the transmission efficiency is also lowered.

As such, it is important to determine an appropriate shape and an appropriate size of the primary coil in order to extend the active area and improve the transmission efficiency. A multi-coil scheme adopting two or more primary coils may be an effective method that extends the active area of the wireless power transmitting apparatus.

Figure 5:
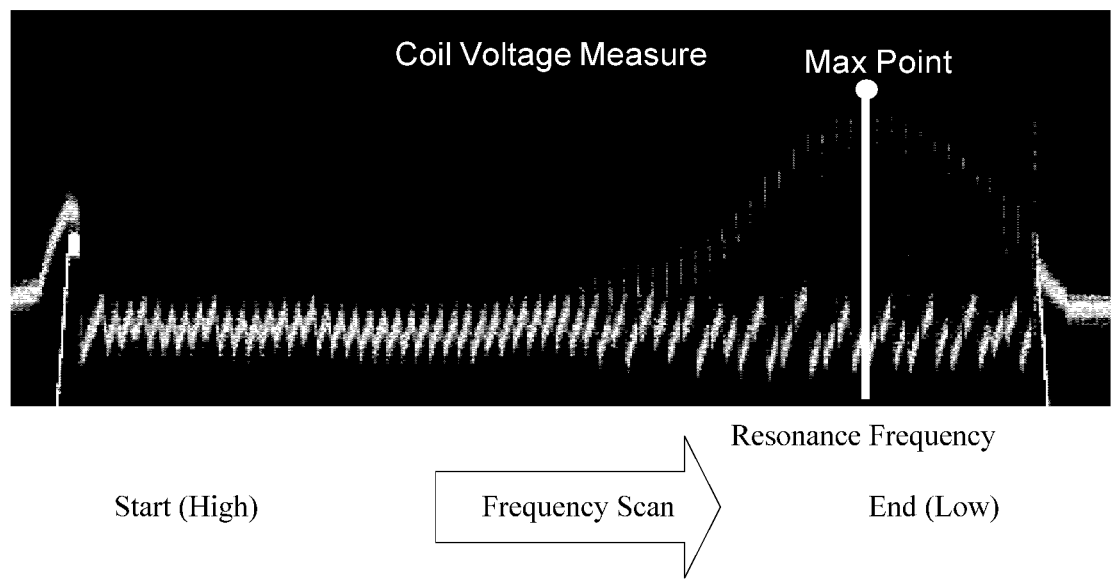
FIG. 5 shows a signal when a frequency is scanned from a high frequency to a low frequency to detect a resonance frequency.
Figure 6:
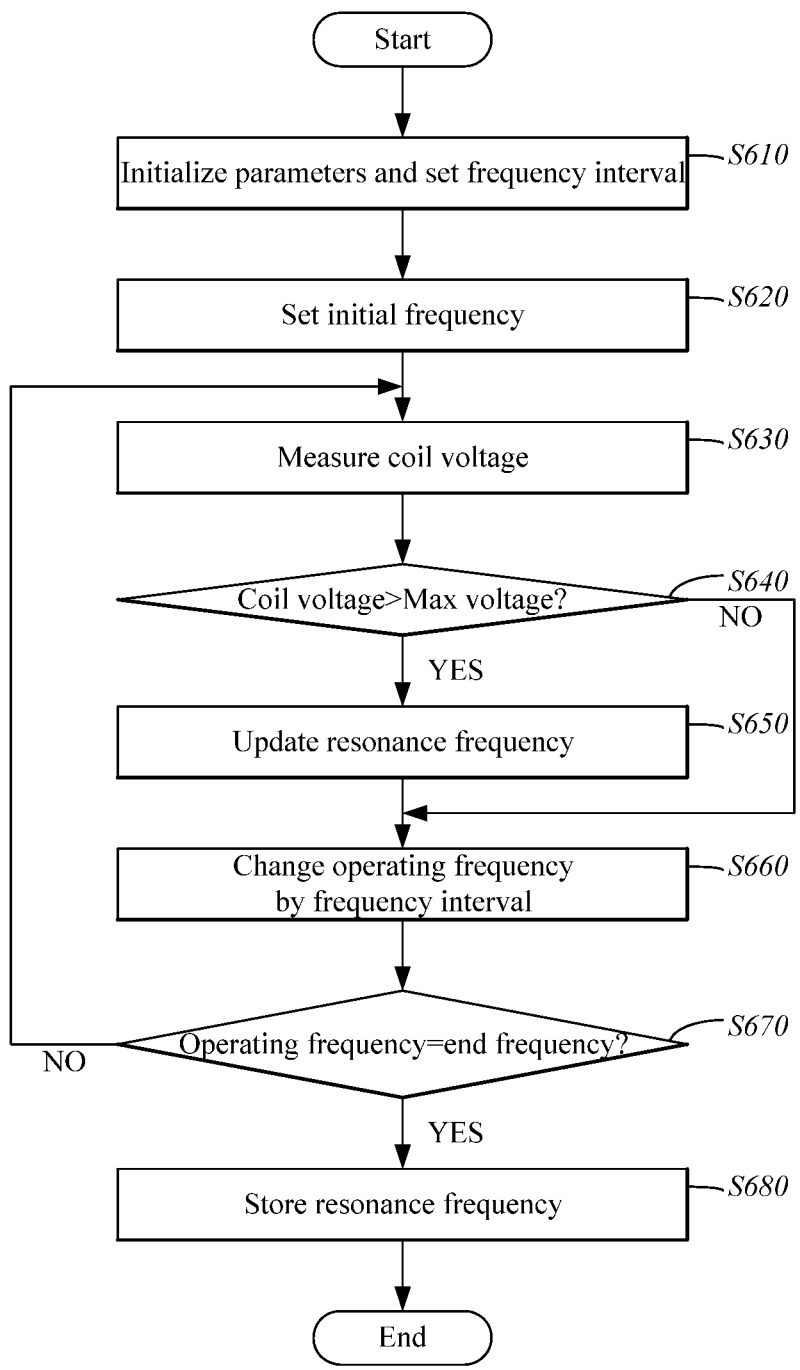
FIG. 6 is a flowchart illustrating a method of detecting and storing a resonance frequency.

FIG. 5 shows a signal when a frequency is scanned from a high frequency to a low frequency to detect a resonance frequency, and FIG. 6 is a flowchart illustrating a method of detecting and storing a resonance frequency.

The first control unit 130 of the wireless power transmitting apparatus 100 measures the voltage applied to the coil of a resonance circuit while controlling the on/off timings of the switches included in the inverter of the power conversion unit 110 in a state where there is no object on the transmitting apparatus to detect a resonance frequency of the resonance circuit. In the resonance circuit of FIG. 2, the voltage applied to the primary coil Lp is measured at a first node Ni between the primary coil Lp and the capacitor Cp.

The first control unit 130 changes the operating frequency, a voltage, etc. of the power conversion unit 110 in order to transmit power according to the power transfer contract concluded with the receiving device 200. So, the first control unit 130 may scan the frequency while increasing or decreasing the operating frequency by a predetermined frequency interval.

The first control unit 130 may be programmed to receive the output voltage applied to the primary coil of the power conversion unit 110 while scanning frequency, and to calculate the operating frequency at which the output voltage is maximized as the resonance frequency.

The wireless power transmitting apparatus 100 may further include a sensing unit for measuring the output voltage applied to the primary coil of the power conversion unit 110 in the power conversion unit 110 or separately from the power conversion unit 110.

As shown in FIG. 5, the wireless power transmitting apparatus 100 may measure the voltage applied to the coil by driving the resonance circuit while scanning frequency from high frequency to low frequency. The frequency at which the voltage of the coil is largest corresponds to the self-resonance frequency F0 of the resonant circuit.

First, the first control unit 130 initializes internal parameters and sets a frequency interval to increase or decrease an operating frequency when scanning the operating frequency at the step of 610 S610, and sets an initial frequency at which to start the frequency scan at the step of 620 S620.

The first control unit 130 measures the coil voltage applied to the primary coil of the resonance circuit at the step of 630 S630 and compares the measured coil voltage with the maximum voltage among the voltages measured so far at the step of 640 S640. When the coil voltage is larger than the maximum voltage (YES at the step of 640 S640), the first control unit 130 updates the resonance frequency by a current operating frequency at the step of 650 S650, and otherwise (NO at the step of 640 S640), the first control unit 130 advances to a next step.

The first control unit 130 controls the power conversion unit 110 to change the operating frequency by the frequency interval set at the step of 610 S610 at the step of 660 S660 and identifies whether the changed operating frequency corresponds to an end frequency at the step of 670 S670. When the changed operating frequency does not reach the end frequency (NO at the step of 670 S670), the first control unit 130 advanced to the step of 630 S630 in order to measure the coil voltage applied to the primary coil when the changed operating frequency is applied.

When the changed operating frequency reaches the end frequency (YES at the step of 670 S670), the first control unit 130 stores the resonance frequency which is updated by the operating frequency at which the maximum coil voltage is output at the step of 650 S650 in a non-volatile memory at the step of 680 S680.

FIG. 5 illustrates the embodiment which detects the resonance frequency while changing the operation frequency from high frequency to low frequency, however another embodiment may detect the resonance frequency while changing the operation frequency from low frequency to high frequency The first control unit 130 of the wireless power transmitting apparatus 100 may detects the resonance frequency by measuring the coil voltages while changing the operating frequency in order to determine whether an object is positioned on the interface surface, before wireless power transmission is started after power is applied to the transmitting apparatus 100.

Figure 7:
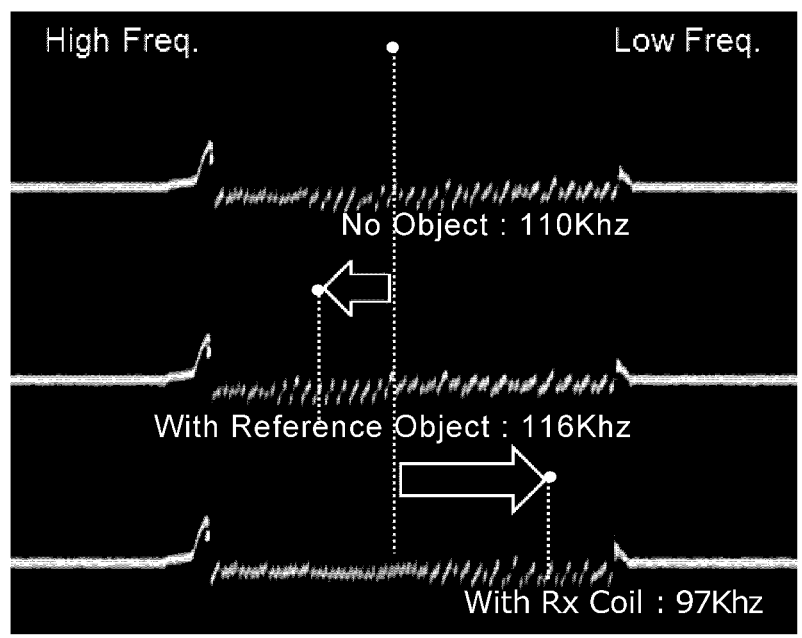
FIG. 7 shows a change in a resonance frequency according to an object placed on a wireless power transmitting apparatus.

FIG. 7 shows a change in a resonance frequency according to an object placed on a wireless power transmitting apparatus.

When a metallic foreign object such as a coil is laid on the interface surface of the transmitting apparatus including the resonance circuit in which a self resonance frequency F) is 110 KHz, the inductance of a primary coil or a transmitting is reduced due to the foreign object, and the resonance frequency is shifted to a frequency higher than when no object is present, for example, 116 KHz in FIG. 7

However, when a receiving device is laid on the interface surface of the transmitting apparatus, an induction electromotive force is generated between a primary coil and a secondary coil and the inductance of the primary coil is increased due to a mutual inductance. When frequency scanning is performed, the resonance frequency is shifted to a frequency lower than when no object is present, for example, 97 KHz in FIG. 7

When a receiving device and a metal foreign object are laid together on the interface surface of the transmitting apparatus, the resonance frequency becomes 111 KHz, similar to the self-resonance frequency F0.

The present invention makes use of the feature that the resonance frequency of the resonance circuit of a transmitting apparatus is increased when an object laid on the transmitting apparatus is a metallic foreign object and the resonance frequency is decreased when a receiving device is laid on the transmitting apparatus. So, in the present invention, a reference frequency is determined by combining the resonance frequency when a receiving device is laid on a transmitting apparatus and the resonance frequency when a receiving device and a metallic foreign object are simultaneously laid on the transmitting apparatus, a resonance frequency is measured when an object is laid on the transmitting apparatus, the measured resonance frequency is compared with the reference frequency, and it is effectively detected whether a metallic object is laid or a receiving device is laid on the transmitting apparatus based on the result of the comparison.

The transmitting apparatus according to the present invention measures a self resonance frequency F0 and an output voltage Q-Factor which are determined by a coil and a capacitor of a resonance circuit, in a state where a receiving device or a foreign object is not laid on the interface surface of the transmitting apparatus, and stores them as the self resonance frequency and a reference voltage.

And, the transmitting apparatus measures and stores a first resonance frequency F1 while changing an operating frequency within a range of ±20% of the stored self resonance frequency F0, in a state where a receiving device is laid on the interface surface of the transmitting apparatus.

Also, the transmitting apparatus measures and stores a second resonance frequency F2 while changing an operating frequency within a range of ±20% of the stored self resonance frequency F0, in a state where a reference object made of a metal is laid on the interface surface of the transmitting apparatus.

Further, the transmitting apparatus measures and stores a third resonance frequency F3 while changing an operating frequency within a range of ±20% of the stored self resonance frequency F0, in a state where the receiving device and the reference object made of a metal are laid together on the interface surface of the transmitting apparatus.

Then, the transmitting apparatus calculates a reference frequency Ffod for determining whether a metallic foreign object is present by using the self resonance frequency F0 and the first to third resonance frequencies F1-F3, and stores it in a nonvolatile memory.

For example, the reference frequency Ffod may be determined by a combination of the first resonance frequency F1 for the receiving device and the third resonance frequency F3 for the receiving device and the reference object such that Ffod=(F1+a*F3)/b, where a and b can be determined through experiments. In the example of FIG. 7 in which the self resonance frequency F0 is 110 KHz and the first resonance frequency F1 and the third resonance frequency are respectively 97 KHz and 111 KHz, the reference frequency Ffod may be 106.3 KHz when a and b are respectively 2 and 3.

Or, the reference frequency Ffod may be determined by a combination of the first resonance frequency F1 for the receiving device and the second resonance frequency F2 for the reference object such that Ffod=(F1+c*F2)/d, where c and d can be also determined through experiments The reference frequency Ffod may be determined in various ways by a combination of two or more among four frequencies including the self resonance frequency F0 and the first to third resonance frequencies F1-F3.

The process of measuring the self resonance frequency F0 and the first to third resonance frequencies F1-F3 and calculating and storing the reference frequency Ffod may be performed in the process of shipping the transmitting apparatus.

Figure 8:
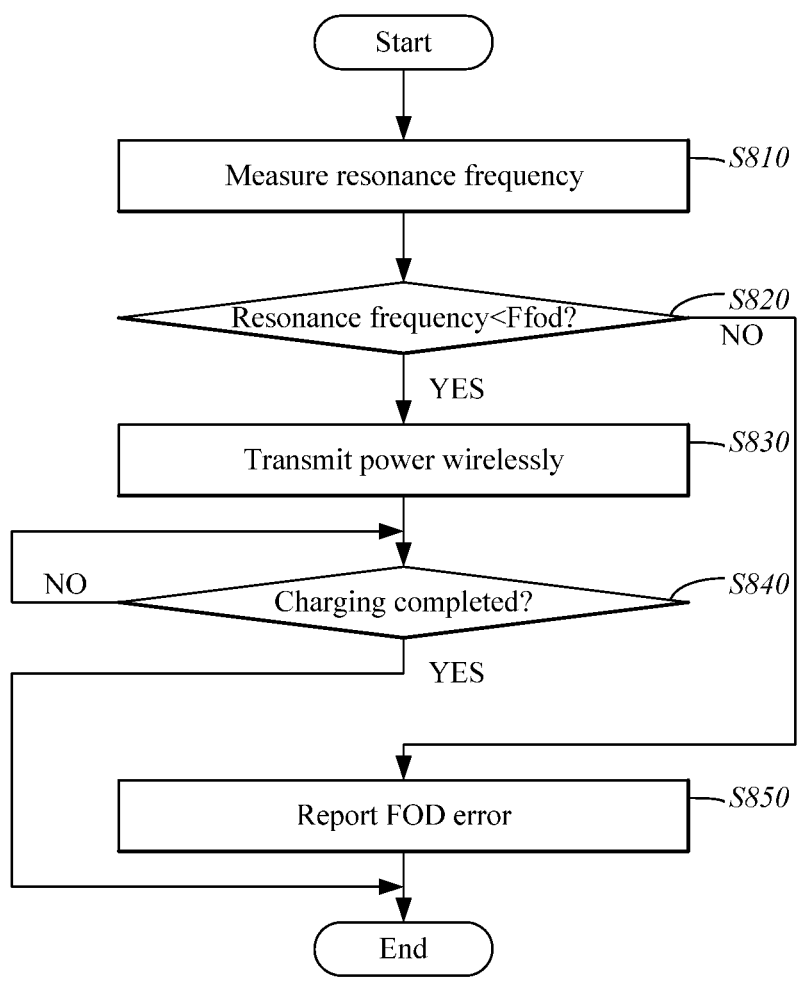
FIG. 8 is a flowchart illustrating a method of detecting a foreign object and transmitting power wirelessly according to an embodiment of the present invention.

FIG. 8 is a flowchart illustrating a method of detecting a foreign object and transmitting power wirelessly according to an embodiment of the present invention.

When identifying that an object is laid on the interface surface of the transmitting apparatus, the first control unit 130 of the transmitting apparatus measures a resonance frequency while changing an operating frequency within a range of ±20% of the stored self resonance frequency F0 at the step of 810 S810

The first control unit 130 compares the measured resonance frequency with the reference frequency Ffod at the step of 820 S820.

When the receiving device including a secondary coil is laid on the interface surface, the inductance of a primary coil is increased to shift the resonance frequency such that the resonant frequency moves in a direction of decreasing with respect to the self resonance frequency F0 and becomes smaller than the reference frequency Ffod (YES at the step of 820 S820). So, the first control unit 130 determines that the secondary coil of the receiving device is close to the transmitting apparatus, and controls the power conversion unit 110 and the first communication unit 120 to transmit power wirelessly to the receiving device at the step of 830 S830.

The first control unit 130 performs the operation of transmitting power to the receiving device until the charging of the receiving device is completed.

On the other hand, when a foreign object made of a metal is laid on the interface surface, as the inductance decreases, the resonant frequency moves in a direction of increasing relative to the self resonance frequency F0 and becomes larger than the reference frequency Ffod (NO at the step of 820 S820). So, the first control unit 130 determines that a metallic foreign object is close to the transmitting apparatus, and may display an error warning the user to remove the foreign object without transmitting power at the step of 850 S850.

When a receiving device and a metallic foreign object are simultaneously closer to the transmitting apparatus, due to the interaction of the receiving device and the metal, the resonance frequency becomes similar to the resonance frequency of an initial state, that is the resonance frequency becomes 111 KHz in the example of FIG. 7 where the self resonance frequency Ffod is 110 KHz so becomes larger than the self resonance frequency Ffod (NO at the step of 820 S820). So, the first control unit 130 may display an error indicating that a foreign object is present.

Meanwhile, when a receiving device and a metallic foreign object are simultaneously closer to the transmitting apparatus, due to the interaction of the receiving device and the metal, a measured resonance frequency becomes similar to the self resonance frequency F0, that is the difference between the measured resonance frequency and the self resonance frequency F0 becomes less than a predetermined value. Then, with the resonance frequency alone, it may be difficult to distinguish this case from a state where nothing is placed on the interface surface of the transmitting apparatus.

However, in this case, since an output voltage Q-Factor decreases due to the increase of the AC resistance due to the foreign object, the first control unit 130 may compare a stored output voltage with the measured output voltage, judge that nothing is placed on the interface surface of the transmitting apparatus when the difference between the stored reference voltage and the measured output voltage is less than a predetermined value and judge that a receiving device and a metallic foreign object are laid together on the transmitting apparatus when the difference is larger than the predetermined value. Thus, the state where nothing is placed on the interface surface of the transmitting apparatus and the state where a receiving device and a metallic foreign object are placed together may be discerned therebetween. This operation may be performed between the step of 820 S820 and the step of 850 S850.

It is possible to effectively detect the presence or absence of a metallic foreign object from a small size to a large size and it is also possible to avoid the problem of heat generation by transmitting power in the presence of a foreign object.

Throughout the description, it should be understood by those skilled in the art that various changes and modifications are possible without departing from the technical principles of the present invention. Therefore, the technical scope of the present invention is not limited to the detailed descriptions in this specification but should be defined by the scope of the appended claims.

What is claimed is:

1. A method of transmitting power in a wireless power transmitting apparatus, comprising:
    measuring a resonance frequency while changing an operating frequency of a resonance circuit;
    comparing the measured resonance frequency with a reference frequency; and
    wirelessly transmitting power when the measured resonance frequency is lower than the reference frequency,
    wherein the reference frequency is determined based on two or more among a self resonance frequency of the resonance circuit, a first resonance frequency measured for a receiving device, a second resonance frequency measured for a reference object and a third resonance frequency measured for the receiving device and the reference object.

2. The method of claim 1, further comprising:
    notifying a presence of a foreign object without transmitting power when the measured resonance frequency is lower than the reference frequency.

3. The method of claim 1, wherein a reference voltage, which is applied to a coil included in the resonance circuit when driving the resonance circuit in a state where no object is present on the wireless power transmitting apparatus, the reference frequency and the self resonance frequency are stored in a process of shipping the wireless power transmitting apparatus.

4. The method of claim 3, further comprising:
    comparing a first voltage applied to the coil while driving the resonance circuit with the measured resonance frequency with the reference voltage, when a difference between the measured resonance frequency and the self resonance frequency is less than a first predetermined value; and
    notifying a presence of a foreign object without transmitting power, when a difference between the reference voltage and the first voltage is larger than a second predetermined value.

5. The method of claim 4, wherein it is judged that nothing is placed on the wireless power transmitting apparatus when the difference between the reference voltage and the first voltage is less than the second predetermined value.

6. A wireless power transmitting apparatus, comprising:
    a power conversion unit including an inverter for converting a DC input into an AC waveform, a resonance circuit including a primary coil for transmitting power by magnetic induction coupling with a secondary coil of a receiving device, and a sensing unit for measuring an output voltage applied to the primary coil; and
    a control unit configured to measure a resonance frequency based on the output voltage measured by the sensing unit while changing an operating frequency of the resonance circuit, compare the measured resonance frequency with a reference frequency, and control the inverter to wirelessly transmitting power to the receiving device when the measured resonance frequency is lower than the reference frequency,
    wherein the reference frequency is determined based on two or more among a self resonance frequency of the resonance circuit, a first resonance frequency measured for a receiving device, a second resonance frequency measured for a reference object and a third resonance frequency measured for the receiving device and the reference object.

7. The method of claim 6, wherein the control unit is configured to notify a presence of a foreign object without transmitting power to the receiving device when the measured resonance frequency is lower than the reference frequency.

8. The method of claim 6, wherein a reference voltage, which is applied to a coil included in the resonance circuit when driving the resonance circuit in a state where no object is present on the wireless power transmitting apparatus, the reference frequency and the self resonance frequency are stored in a process of shipping the wireless power transmitting apparatus.

9. The method of claim 8, wherein the control unit is configured to compare a first voltage applied to the coil while driving the resonance circuit with the measured resonance frequency with the reference voltage when a difference between the measured resonance frequency and the self resonance frequency is less than a first predetermined value, and notify a presence of a foreign object without transmitting power to the receiving device when a difference between the reference voltage and the first voltage is larger than a second predetermined value.

10. The method of claim 9, wherein the control unit is configured to judge that nothing is placed on the wireless power transmitting apparatus when the difference between the reference voltage and the first voltage is less than the second predetermined value.

* * * * *